United States Patent
Egan et al.

(10) Patent No.: US 11,143,069 B2
(45) Date of Patent: Oct. 12, 2021

(54) METHOD AND APPARATUS TO ENABLE PACKAGE SPACE REDUCTION IN A VEHICLE EXHAUST SYSTEM

(71) Applicant: Faurecia Emissions Control Technologies, USA, LLC, Columbus, IN (US)

(72) Inventors: James Egan, Indianapolis, IN (US); Thorsten Keesser, Augsburg (DE); Dieter Fahrlaender, Alzenau (DE)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 557 days.

(21) Appl. No.: 16/036,061

(22) Filed: Jul. 16, 2018

(65) Prior Publication Data
US 2019/0093528 A1    Mar. 28, 2019

Related U.S. Application Data

(63) Continuation-in-part of application No. PCT/US2017/053186, filed on Sep. 25, 2017.

(51) Int. Cl.
| | |
|---|---|
| *F01N 1/02* | (2006.01) |
| *F01N 13/00* | (2010.01) |
| *F01N 3/28* | (2006.01) |
| *F01N 1/08* | (2006.01) |
| *F01N 3/08* | (2006.01) |
| *F01N 3/033* | (2006.01) |
| *G10K 11/172* | (2006.01) |
| *F01N 13/18* | (2010.01) |

(52) U.S. Cl.
CPC ............. *F01N 1/023* (2013.01); *F01N 1/02* (2013.01); *F01N 1/089* (2013.01); *F01N 3/0335* (2013.01); *F01N 3/08* (2013.01); *F01N 3/2885* (2013.01); *F01N 13/0097* (2014.06); *G10K 11/172* (2013.01); *F01N 13/1805* (2013.01); *F01N 2230/02* (2013.01); *F01N 2230/04* (2013.01); *F01N 2490/00* (2013.01)

(58) Field of Classification Search
CPC .. F01N 1/023; F01N 2490/00; F01N 13/0097; F01N 1/089; F01N 3/0335; F01N 1/02; F01N 3/08; F01N 3/2885; F01N 13/1805; F01N 2230/02; F01N 2230/04; G10K 11/172
USPC ........................................................ 181/250
See application file for complete search history.

(56) References Cited

U.S. PATENT DOCUMENTS

| | | |
|---|---|---|
| 3,990,414 A | 11/1976 | Malphettes |
| 4,779,415 A | 10/1988 | Richardson et al. |

(Continued)

FOREIGN PATENT DOCUMENTS

| | | |
|---|---|---|
| DE | 309334 A1 | 2/1915 |
| EP | 1475522 | 11/2004 |

(Continued)

*Primary Examiner* — Forrest M Phillips
(74) *Attorney, Agent, or Firm* — Carlson, Gaskey & Olds, P.C.

(57) ABSTRACT

A vehicle exhaust system includes a hot end having one or more hot end exhaust components that treat emissions generated by an engine and a cold end that includes at least one cold end component that attenuates noise. At least one acoustic volume is in parallel or serial to the hot end to further attenuate noise.

28 Claims, 4 Drawing Sheets

(56) References Cited

U.S. PATENT DOCUMENTS

| | | | |
|---|---|---|---|
| 5,285,640 A | 2/1994 | Olivo | |
| 5,493,080 A * | 2/1996 | Moss | F01N 1/003 181/227 |
| 6,935,461 B2 * | 8/2005 | Marocco | F01N 1/02 181/212 |
| 6,990,804 B2 | 1/2006 | Jacob et al. | |
| 7,246,680 B2 * | 7/2007 | Osterkamp | F01N 1/02 180/296 |
| 8,916,104 B2 * | 12/2014 | Lee | F01N 1/10 422/180 |
| 9,140,174 B2 * | 9/2015 | Wikaryasz | B01D 46/4218 |
| 9,482,148 B2 | 11/2016 | Wade et al. | |
| 9,556,781 B2 * | 1/2017 | Ludeman | F01N 13/08 |
| 9,587,535 B2 * | 3/2017 | Williams | F01N 1/082 |
| 2005/0115229 A1 | 6/2005 | Worner et al. | |
| 2005/0230182 A1 * | 10/2005 | Nezan | F01N 1/003 181/250 |
| 2008/0041043 A1 | 2/2008 | Andersen | |
| 2010/0307143 A1 | 12/2010 | Colette | |
| 2011/0203692 A1 | 8/2011 | Werni et al. | |
| 2013/0333977 A1 | 12/2013 | Wirth et al. | |
| 2014/0174057 A1 * | 6/2014 | Ludeman | F01N 3/106 60/274 |
| 2017/0114698 A1 | 4/2017 | Jerges et al. | |
| 2017/0276043 A1 * | 9/2017 | Khan | F01N 1/026 |
| 2017/0294181 A1 * | 10/2017 | Koch | G10K 11/17825 |

FOREIGN PATENT DOCUMENTS

| | | | | |
|---|---|---|---|---|
| EP | 2163739 | 3/2010 | | |
| WO | WO-0171169 A1 * | 9/2001 | | F01N 3/023 |
| WO | WO-2005059324 A1 * | 6/2005 | | B01D 53/9431 |
| WO | 2008078020 | 7/2008 | | |
| WO | 2009106832 | 9/2009 | | |
| WO | 201607112 | 1/2016 | | |

* cited by examiner

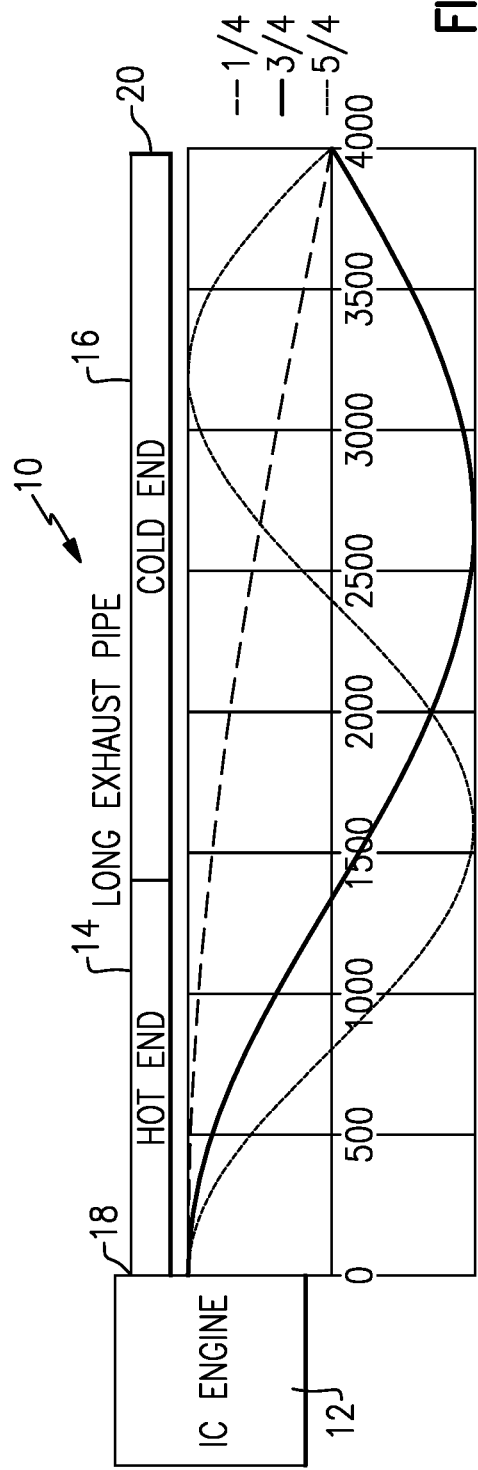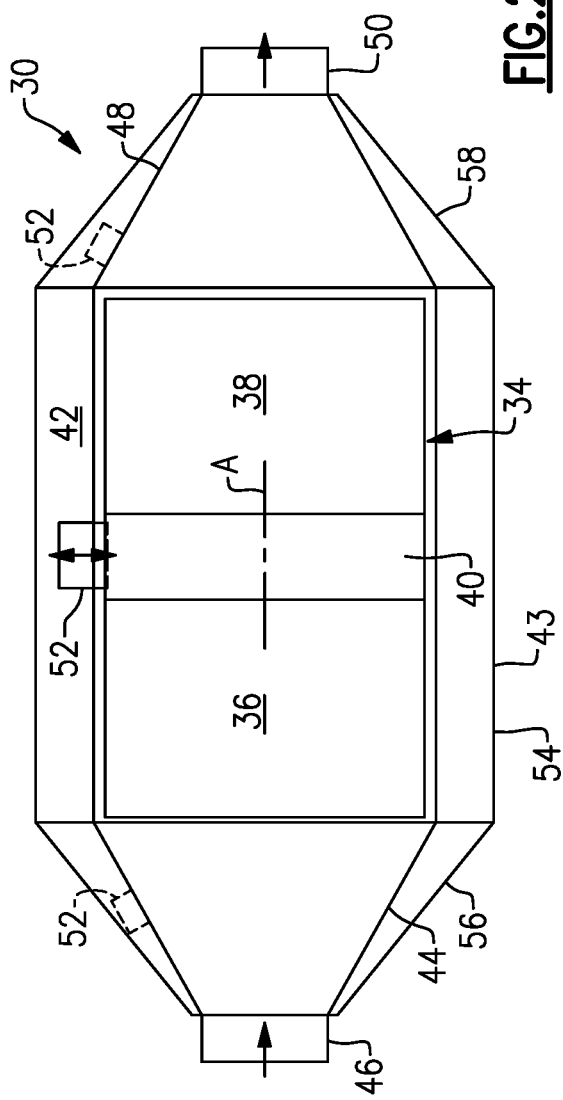

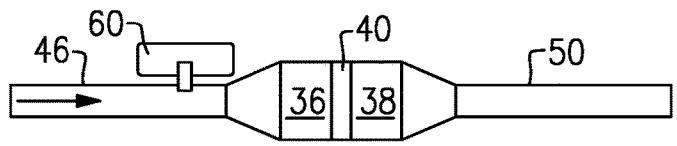
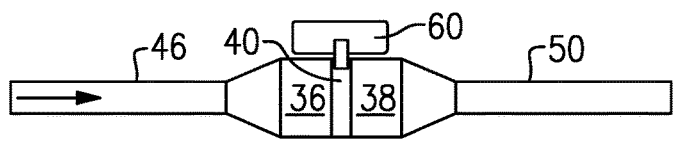
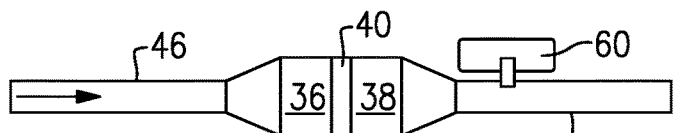
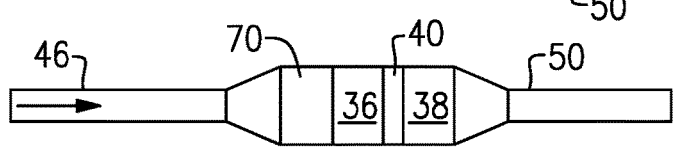
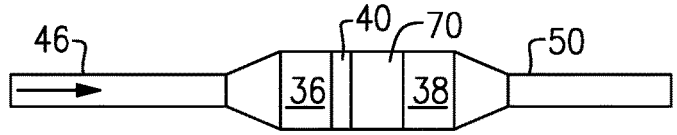
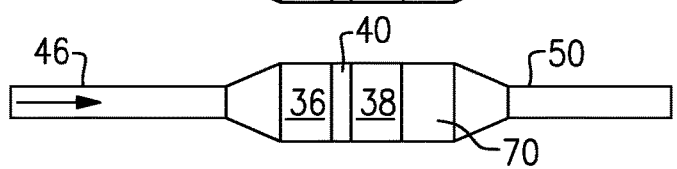
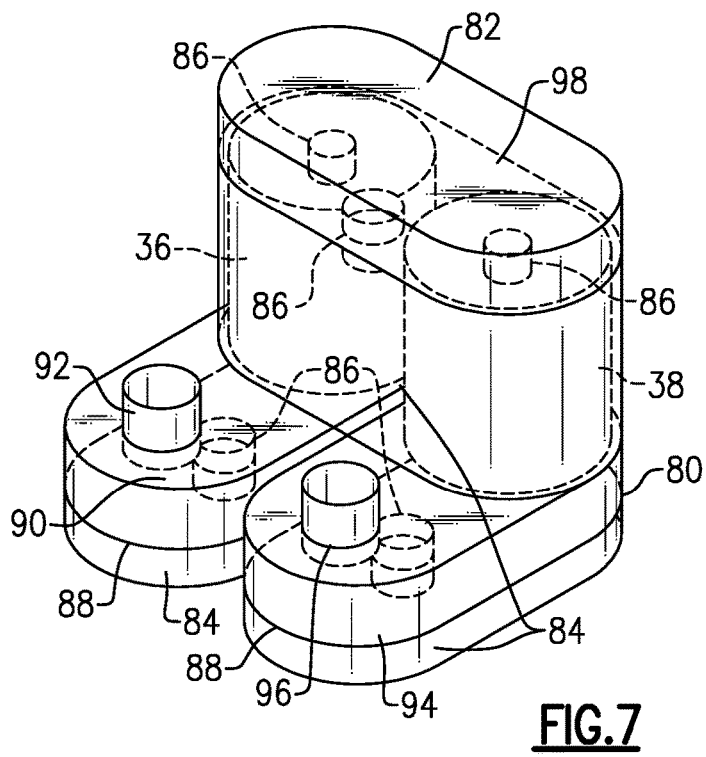

METHOD AND APPARATUS TO ENABLE PACKAGE SPACE REDUCTION IN A VEHICLE EXHAUST SYSTEM

CROSS-REFERENCE TO RELATED APPLICATION

This application is a continuation-in-part application of PCT/US17/53186, filed Sep. 25, 2017.

BACKGROUND OF THE INVENTION

A vehicle exhaust system conducts hot exhaust gases generated by an engine through various exhaust components to reduce emissions, improve fuel economy, and control noise. Emerging powertrain technologies are requiring the industry to provide even more stringent noise reduction. The frequencies that need to be attenuated are being pushed to lower and lower levels that have not been previously addressed. One traditional solution to attenuate such frequencies is to provide more internal volume; however, electrification of vehicles is putting increased pressure on packaging space available for exhaust system components. Additionally, the industry's continued push for improved fuel economy adds further design challenges to reduce exhaust system weight and improve aerodynamics.

These conflicting areas, e.g. the need for more volume to reduce lower frequencies vs. reduced packaging space available for exhaust components due to space required for battery packs, indicate that there is a need for unique acoustic solutions that are more efficient from a volume perspective and that do not adversely affect fuel economy and engine performance.

SUMMARY OF THE INVENTION

In one exemplary embodiment, a vehicle exhaust system includes a hot end having one or more hot end exhaust components that treat emissions generated by an engine and a cold end that includes at least one cold end component that attenuates noise. At least one acoustic volume is in parallel or serial to the hot end to attenuate noise.

In another exemplary embodiment, a vehicle exhaust system includes a hot end including one or more hot end exhaust components that treat emissions generated by an engine and a cold end that includes at least one cold end component that attenuates noise, wherein the at least one cold end component comprises at least one of a valve, resonance free pipe, or active noise cancellation. The at least one acoustic volume comprises a parallel or serial volume connected to the hot end downstream of the engine.

In a further embodiment of any of the above, the hot end treats emissions and is defined by a first overall operational length that extends from an engine outlet to a final exhaust component that treats emissions, and the cold end provides acoustic treatment and is defined by a second overall operational length that extends from the final exhaust component that treats emissions to an exhaust system outlet at one or more tailpipes.

In a further embodiment of any of the above, the hot end components include at least one of a three-way catalyst, selective catalytic reduction catalyst, oxidation catalyst, or particulate filter.

In a further embodiment of any of the above, the at least one cold end component comprises only the resonance free pipe and one valve.

In a further embodiment of any of the above, the at least one cold end component comprises only one valve.

In a further embodiment of any of the above, the at least one acoustic volume in the hot end comprises at least two acoustic volumes in the hot end.

In a further embodiment of any of the above, the at least one cold end component comprises only the active noise cancellation, and wherein the at least one acoustic volume in the hot end comprises at least two acoustic volumes in the hot end.

In another exemplary embodiment, a method of providing a reduced package space exhaust system comprises the steps of: providing a hot end including one or more hot end exhaust components that treat emissions generated by an engine; providing a cold end that includes at least one cold end component that attenuates noise wherein the at least one cold end component comprises at least one of a valve, resonance free pipe, or active noise cancellation; and providing at least one acoustic volume parallel or serial to the hot end to attenuate noise in combination with the at least one cold end component to eliminate one or more cold end mufflers and/or resonators and reduce an overall length of the cold end.

These and other features of this application will be best understood from the following specification and drawings, the following of which is a brief description.

BRIEF DESCRIPTION OF THE DRAWINGS

FIG. 1 schematically illustrates a vehicle exhaust system and shows standing pressure waves generated by the system.

FIG. 2 shows one example of a hot end component of the system of FIG. 1 and which includes the subject invention.

FIG. 5A shows another example embodiment.
FIG. 5B shows another example embodiment.
FIG. 5C shows another example embodiment.
FIG. 6A shows another example embodiment.
FIG. 6B shows another example embodiment.
FIG. 6C shows another example embodiment.
FIG. 7 shows another example embodiment.

DETAILED DESCRIPTION

Figure 3:
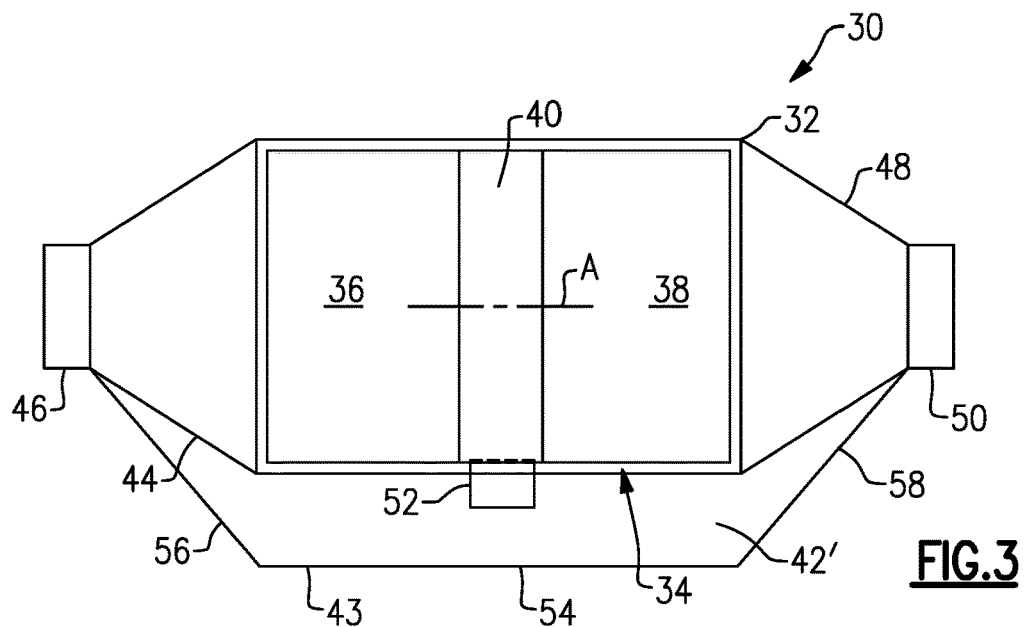
FIG. 3 shows another example embodiment.

FIG. 1 shows a schematic representation of a vehicle exhaust system 10 as a long pipe that conducts hot exhaust gases generated by an engine 12 through various exhaust components to reduce emission and control noise as known. The various exhaust components can include one or more of the following: pipes, filters, valves, catalysts, mufflers etc. The exhaust system 10 includes a hot end 14 that is located immediately downstream of the engine 12 and a cold end 16 that is downstream of the hot end 14. The long pipe is considered closed at an engine end 18 and open at an opposite end 20 where, after passing though the various exhaust components, the engine exhaust gas exits the exhaust system 10 to atmosphere.

The hot end 14 comprises a portion of the exhaust system 10 that includes after-treatment components. Exhaust components at the hot end 14 can include, for example, exhaust gas treatment elements such as a diesel oxidation catalyst (DOC), a diesel particulate filter (DPF), a gasoline particulate filter (GPF), a three-way catalyst (TWC), and a selective catalytic reduction (SCR) catalyst that are used to remove contaminants from the exhaust gas as known. The hot end 14 extends from an engine outlet, e.g. exhaust manifold or turbocharger, through the after-treatment components, and ends just after the last after-treatment element. Exhaust gases pass through these hot end components and enter the cold end 16 where the exhaust gas exits the system 10 via an exhaust system outlet via one or more tailpipes. The cold end 16 comprises a portion of the exhaust system 10 that is downstream of the after-treatment elements and includes components for acoustic treatment of the exhaust system 10. The cold end 16 can include components such as mufflers, resonators, pipes, valves, and one or more tailpipes, for example. The cold end 16 extends from the last after-treatment component, through the acoustic components, and ends at the outlet from one or more tailpipes. A flange joint typically connects the hot 14 and cold 16 sections together. Thus, the hot end 14 comprises after-treatment/emissions components while the cold end 16 comprises acoustic components. The described exhaust components can be mounted in various different configurations and combinations dependent upon vehicle application and available packaging space.

As discussed above, FIG. 1 shows the exhaust system schematically illustrated as a long pipe that is closed at the engine end 18 and open at the opposite end 20 to atmosphere. Acoustic waves will travel from their source, which is the engine 12, down the pipe and then the exit to atmosphere. When the acoustic wave encounters a boundary of some form, e.g. an impedance change, then some fraction of the wave will be reflected back the way it came and the remaining fraction will continue. In the case of a closed-open pipe such as shown in FIG. 1, this reflection occurs at the exit of the pipe. The reflected wave interferes with the incident wave and at certain frequencies, which are a function of the length of the pipe, constructively interfere to increase the level of the wave and also to make the wave appear stationary. Such waves are called standing waves and in the case of a closed-open pipe the frequencies of such waves may be calculated with the equation below.

Fn=(nc)/(4L) where:
fn=resonant frequency of standing wave n (Hz)
n=ordinal number of standing wave
c=speed of sound (m/s)
L=length of closed-open pipe (m)

The chart of FIG. 1 shows the first three standing pressure waves for a closed-open pipe of 4 meters in length. In this example, the resonances occur at 22, 65 and 108 Hz. As shown, for each standing wave the pressure is a maximum (anti-node) at the closed engine end 18 and a minimum (node) at the open end 20 to atmosphere. The ideal place for a Helmholtz resonator is at a pressure anti-node. As such, the best position for a resonator is at the engine outlet; however, Helmholtz resonators are not traditionally used in the hot end 14 of exhaust systems 10. The subject invention provides a Helmholtz resonator in the hot end 14 to provide improved acoustic benefits over the same resonator as placed in the cold end 16 as the subject resonator is closer to the anti-node for all system acoustic resonances.

It has been shown through testing and simulations that a Helmholtz Resonator, such as an acoustic volume of the order of 2 to 4 L in communication with the exhaust flow via a neck pipe for example, that is positioned in the hot end 14 between a turbo outlet and a converter, or between converter after-treatment elements, provides an acoustic benefit about twice that of a similar amount of volume applied in the cold end 16 (downstream of the after-treatment) with no impact on back pressure. From a tailpipe noise perspective, positioning the Helmholtz resonator as close as possible to the engine 12 provides the best acoustic performance The subject invention proposes packaging one or more Helmholtz Resonators at one or more locations in the hot end 14 of the system 10. For example, the resonator(s) could be located after the manifold or turbo outlet but before the converters, between the converters; and/or after the converters. Various example configurations are discussed below and shown in the accompanying figures.

FIG. 2 shows one example of a hot end component 30 that is situated downstream of the exhaust manifold and turbocharger. The hot end component 30 includes a component housing 32 that defines an internal cavity 34. A first exhaust gas treatment element 36 is positioned within the internal cavity 34 and a second exhaust gas treatment element 38 is positioned within the internal cavity 34 downstream and axially spaced from the first exhaust gas treatment element 36 by a gap 40. A resonator volume 42 enclosed within a resonator housing 43 is in communication with the internal cavity 34. The resonator housing 43 at least partially surrounds the component housing 32.

An inlet cone 44 directs flow into the first exhaust gas treatment element 36. The inlet cone 44 receives hot engine exhaust gases from an inlet pipe 46. An outlet cone 48 directs treated exhaust gas flow exiting the second exhaust gas treatment element 38 into an outlet pipe 50. In this example, the component housing 32 defines a center axis A and the inlet cone 44, first exhaust gas treatment element 36, second exhaust gas treatment element 38, and outlet cone 48 are coaxial with the center axis A.

At least one resonator connection 52 is in communication with the resonator volume 42 within the resonator housing 43. The resonator housing 43 comprises a center housing portion 54 that encloses the first 36 and second 38 gas treatment elements, an inlet portion 56 that is positioned at one end of the center housing portion 54 to surround the inlet cone 44, and an outlet portion 58 that is positioned at an opposite end of the center housing portion 54 to surround the outlet cone 48. At least one resonator connection 52 is in communication with the resonator volume 42. In the example shown in FIG. 2, the resonator connection 52 comprises a Helmholtz neck that is positioned at the gap 40 and is in communication with Helmholtz resonator volume 42. Optionally, or in addition to, the connection point of the resonator connection 52 could be at the inlet 44 or outlet 48 cone as indicated with dashed lines in FIG. 2.

In each of these different configurations, the configuration is sealed such that there is no net flow in the Helmholtz resonator. Hot engine exhaust gas flows in through the inlet pipe 46, expands and slows down as the gas travels through inlet cone 44, passes through the first exhaust gas treatment element 36, and then expands into the gap 40 between the first 36 and second 48 exhaust gas treatment elements. The Helmholtz resonator connection 52 and resonator volume 42 are in parallel with the flow connected at the gap 40. The exhaust gas then contracts and passes through the second exhaust gas treatment element 38 and then expands into the outlet cone 48 before contracting and exiting through the outlet pipe 50.

The exhaust gas pressure pulsations from the engine travel down through the exhaust system 10 and are modified as they travel through the mechanisms of restriction, reflection, and absorption. When the pulsations reach the gap 40 they cause the exhaust gas in the resonator neck/connection 52 to start moving. For low frequencies this gas can be considered as a lumped mass. The lumped mass of gas in the resonator neck 52 compresses or rarifies the exhaust gas in the surrounding resonator volume 42. As the lumped mass of gas compresses the resonator volume 42, the volume pressure increases. As the lumped mass of gas rarifies, the volume pressure decreases. The result of this pressure is to push the lumped mass in the opposite direction to which it is travelling. In this way, the resonator volume 42 is acting as a spring and provides a spring-mass system with a tuned frequency. As there is no net flow through the Helmholtz resonator, and as the resonator neck 52 comprises a side-branch arrangement, the impact on back pressure is negligible.

In the example shown in FIG. 2, the resonator volume 42 is formed between an inner surface of the resonator housing 43 and an outer surface of the component housing 32. The resonator volume 42 is concentric with the center axis A such that the resonator housing 43 and resonator volume 42 completely and entirely surrounds an outer circumference of the first 36 and second 38 gas treatment elements. FIG. 3 shows an example that is similar to FIG. 2 but which comprises an offset configuration. In this example, the resonator volume 42' is offset relative to the component housing 32 such that the resonator housing 43 and resonator volume 42' only partially surrounds an outer circumference of the first 36 and second 38 gas treatment elements.

Figure 4:
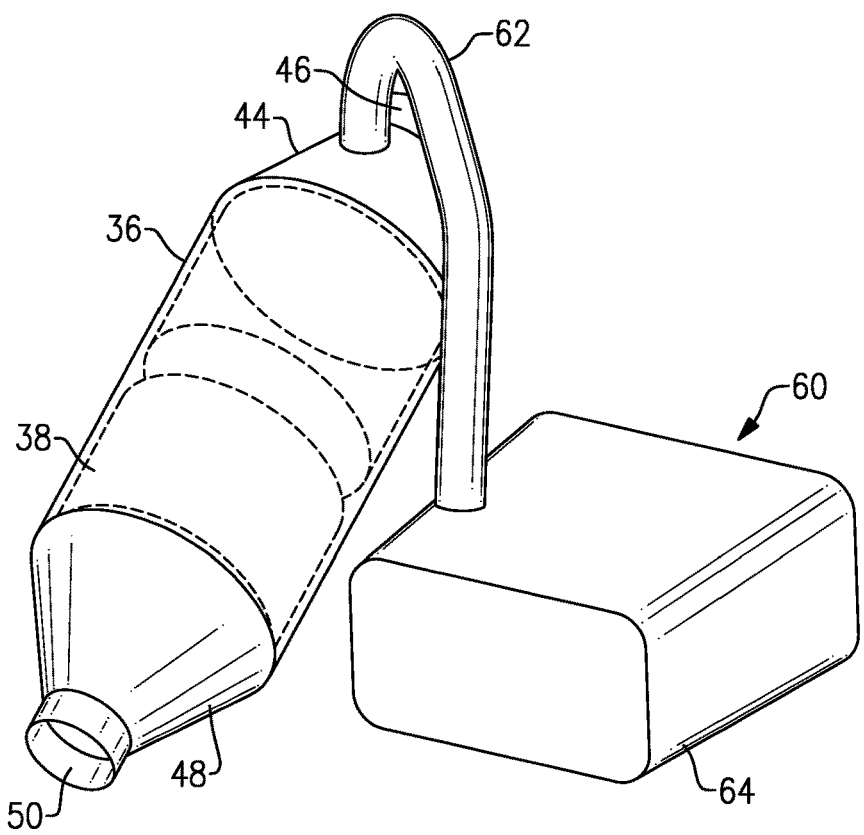
FIG. 4 shows another example embodiment.

FIG. 4 shows another example configuration. In this example, a resonator volume 60 is removed from the component 30 and is connected to the component housing 32 by at least one pipe 62. The resonator volume 60 is enclosed within a resonator housing 64 and the pipe 62 connects the resonator housing 64 to the component 30. As such, the resonator housing 64 and volume 60 are located externally of the component housing 32.

In one example, the resonator housing 64 comprises one or more additional components. In another example, an existing vehicle structure is used to provide the sealed volume, see for example, application Ser. No. 15/874,288 which is assigned to the assignee of the subject application and that is hereby incorporated by reference. In one disclosed example, a vehicle frame member provides a sealed resonator volume 60 that is connected in parallel to the exhaust system flow.

In the example shown in FIG. 4, the pipe 62 connects the resonator housing 64 to the inlet portion 56 of the component housing 32. The pipe 62 also optionally connects to the outlet portion 58; however, the inlet portion 56 is preferred as it is located closer to the engine 12. Optionally, or in addition to, an additional pipe or a branch from the pipe 62 could connect the volume 60 to the center housing portion 54 and one of the inlet 56 or outlet 58 portions.

FIG. 5A shows an example where the external volume 60 is connected to the inlet pipe 46. FIG. 5B shows an example where the external volume 60 is connected to the center housing portion 54 and is in communication with the gap 40. FIG. 5C shows an example where the external volume 60 is connected to the outlet pipe 50.

FIGS. 6A-6C show examples of an internal resonator volume 70 that is in series with the first 36 and second 38 exhaust gas treatment elements. FIG. 6A shows an example where the volume 70 is upstream of the first exhaust gas treatment element 36. FIG. 6B shows an example where the volume 70 is upstream of the second exhaust gas treatment element 38 and downstream of the gap 40. FIG. 6C shows an example where the volume 70 is downstream of the second exhaust gas treatment element 38.

In another example shown in FIG. 7, the first 36 and second 38 gas treatment elements are enclosed within a common housing 80. In this configuration, the first 36 and second 38 exhaust gas treatment elements are non-coaxial and parallel with each other, and are connected by a gap 82 such that exhaust gas exits the first exhaust gas treatment element 36, enters the gap 82, and then enters the second exhaust gas treatment element 38. A plurality of resonator volumes 84 are provided within the housing 80. A plurality of resonator connections 86 are also provided. The housing 80 includes a baffle 88 with an inlet resonator volume 90 coupled to an inlet pipe 92 and an outlet resonator volume 94 coupled to an outlet pipe 96. The housing 80 also includes a second baffle 98 to define a resonator volume at the gap 82.

Possible locations for the resonator connections 86 are at the inlet resonator volume 90, at the outlet resonator volume 94, and at the resonator volume at the gap 82. The resonator connection 86 associated at the gap 82 can be at a location between the elements 36, 38, at an exit from the first exhaust gas treatment element 36, and/or at an entrance to the second exhaust gas treatment element 38. The resonator connections 86 can be used in any number, and in any combination, as needed to provide the desired acoustic effect.

In each of these different parallel configurations, the internal acoustic volume is sealed and in parallel with the exhaust flow through the exhaust system such that there is no net flow in the Helmholtz resonator. Hot engine exhaust gas flows into the component through the inlet pipe, expands and slows down as the gas travels through inlet cone, passes through the exhaust gas treatment element, then contracts and passes through the outlet cone before exiting into the outlet pipe. The neck connects the internal acoustic volume in parallel with the flow through the component to provide the Helmholtz resonator.

Thus, a tuning element with the primary function of acoustic attenuation is combined with a component in the hot end 14 of the exhaust system 10 at a location that is much closer to the pressure anti-node at the engine exhaust outlet than traditional configurations. This provides improved acoustic efficiency with negligible back pressure impact resulting in tailpipe noise/acoustic volume improvement. Further, by including an acoustic volume within the already existing engine sub-frame structure, packaging problems are significantly reduced.

Figure 8:
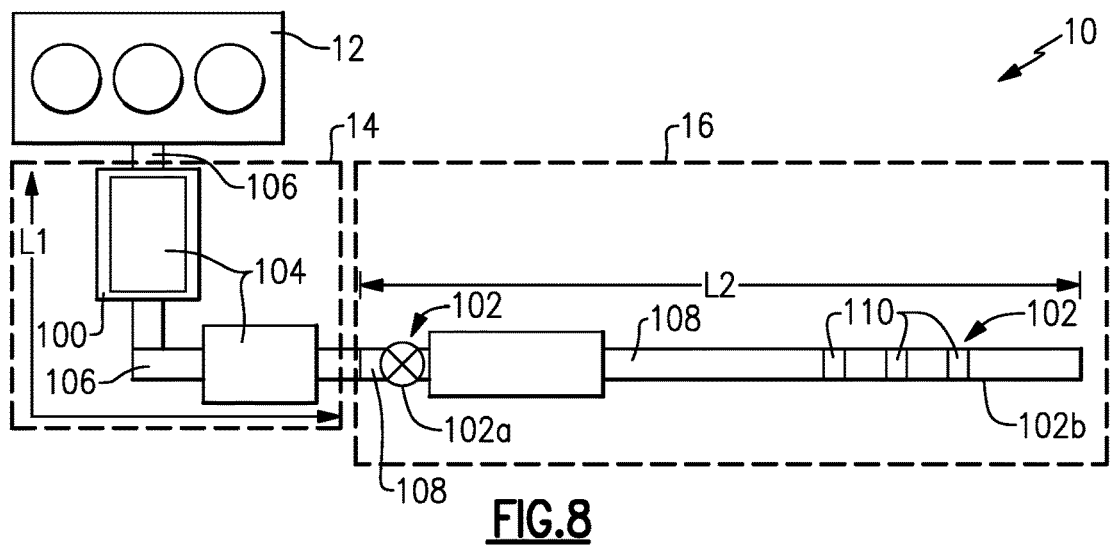
FIG. 8 is a schematic representation of one example of a reduced packaged exhaust system with an acoustic volume in the hot end.
Figure 9:
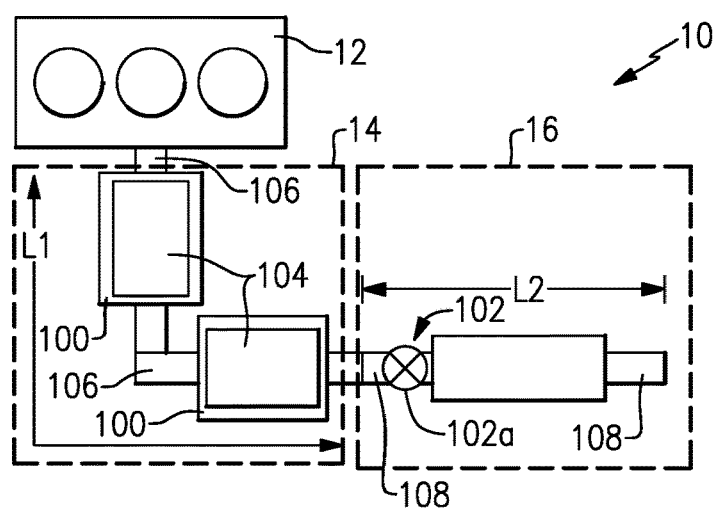
FIG. 9 is another example of a reduced packaged exhaust system with an acoustic volume in the hot end.
Figure 10:
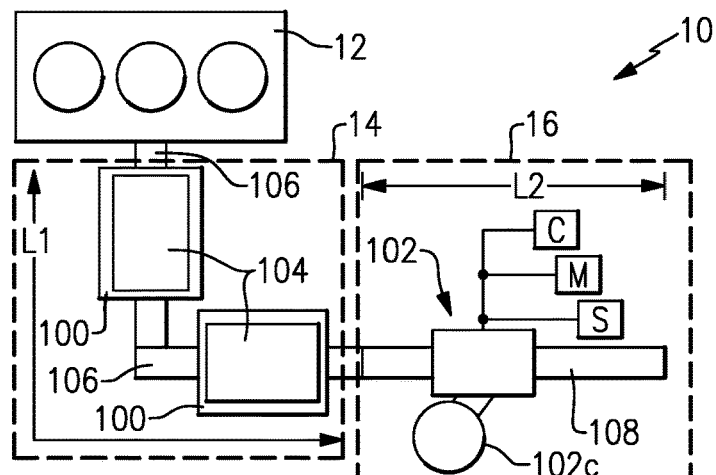
FIG. 10 is another example of a reduced packaged exhaust system with an acoustic volume in the hot end.

FIGS. 8-10 show examples of exhaust systems 10 that utilize one or more acoustic volumes 100 in the hot end 14 in combination with at least one noise attenuation component 102 in the cold end 16 to provide a reduced packaging configuration. The cold end 16 of the exhaust system 10 includes, for example, mufflers, valves, resonators, and tailpipes, etc. that have been traditionally used in various configurations to reduce noise. Hot end components 104 include, for example, a three-way catalyst, selective catalytic reduction catalyst, oxidation catalyst, diesel or gas particulate filter, etc. in various configurations to reduce emissions. The at least one noise attenuation component 102 comprises, for example, at least one of a valve 102a, resonance free pipe 102b, or active noise cancellation system 102c. The subject invention uses the combination of the noise attenuation component 102 in the cold end 16 with at least one acoustic volume 100 in the hot end 14 to eliminate traditional cold end components such as resonators and mufflers, which significantly reduces the amount of area that is taken up by the exhaust system 10.

The valve 102a, for example, can be a passive valve having a valve flap resiliently biased to a closed position and with movement controlled only by changes in exhaust gas pressure within the flow path. The valve 102a could also be an actively controlled valve where movement of a valve flap is controlled by an actuator and control system. Optionally, the valve 102a can be a combination of passive and actively controlled.

The resonance free pipe (RFP) 102b can include one or more bleed holes, for example, that are used to attenuate noise. In one example, the bleed holes are located at pre-determined locations along a length of the pipe to reduce resonance frequency noise. The bleed holes may be covered by mesh or micro-perforated material to further reduce noise as needed.

The active noise cancellation (ANC) system 102c comprises a controller C, microphone M, and speaker S that operate in a known manner to attenuate/cancel noise within the cold end 16 of the exhaust system 10.

FIG. 8 shows an example where the number of cold end 16 components is significantly reduced when compared to traditional exhaust system configurations. The engine 12 directs hot exhaust gases through pipes 106 and the hot end components 104 of the hot end 14 into pipes 108 in the cold end 16. In this example, the hot end 14 includes one acoustic volume 100 that is used with only one valve 102a and a resonance free pipe 102b in the cold end 16. The valve 102a is located in a cold end pipe 108 upstream of the resonance free pipe 102b. The resonance free pipe 102b can include one or more bleed holes 110, for example, that work in conjunction with the valve 102a to attenuate noise to desired levels. No other mufflers or resonators are required in the cold end 16 to attenuate noise. This significantly reduces the length of the cold end 16 as compared to traditional configurations.

FIG. 9 shows an example where the hot end 14 includes two acoustic volumes 100 that are used with only one valve 102a in the cold end 16. In this example, the valve 102a is placed at an upstream end of the cold end 16. This example provides for an even shorter length for the cold end 16.

FIG. 10 shows an example where the hot end 14 includes two acoustic volumes 100 that are used only with the active noise cancellation system 102c in the cold end 16. This example provides for an even shorter length for the cold end 16 than that of FIG. 9. This configuration also has very minimal back pressure.

As shown in each of the examples of FIGS. 8-10, the hot end 14 is defined by a first overall operational length L1 and the cold end 16 is defined by a second overall operational length L2. In one example, a ratio of the first overall operational length L1 to the second overall operational length L2 is within a range of 1:2 to 1:4 depending on a length of the vehicle and an amount of aftertreatment. The hot end acoustic volume(s) 100 is upstream of the last substrate element of the hot end 14 and the gas flow is in parallel to the acoustic volume 100. By using the hot end acoustic volume(s) 100 in combination with a valve 102a, RFP 102b, and/or ANC system 102c in the cold end 16, the amount of packaging spaced reduction is maximized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
a hot end including one or more hot end exhaust components that treat emissions generated by an engine, wherein at least one hot end exhaust component comprises a component housing defining an internal cavity that receives at least one after-treatment substrate;
a cold end that includes at least one cold end component that attenuates noise; and
a resonator housing at least partially surrounding the component housing and in communication with the internal cavity of the component housing to provide at least one acoustic volume in parallel or serial to the hot end to attenuate noise, and wherein an inner surface of the resonator housing is spaced apart from an outer surface of the component housing by the at least one acoustic volume.

2. The vehicle exhaust system according to claim 1, wherein the hot end components include at least one of a three-way catalyst, selective catalytic reduction catalyst, oxidation catalyst, or particulate filter.

3. The vehicle exhaust system according to claim 2, wherein the at least one acoustic volume is arranged in parallel with exhaust flow and comprises an airtight and sealed cavity.

4. The vehicle exhaust system according to claim 2, wherein the at least one acoustic volume is arranged in parallel with exhaust flow and is located within a catalyst or filter housing.

5. The vehicle exhaust system according to claim 2, wherein:
the at least one acoustic volume is arranged in parallel with exhaust flow;
the component housing has a center housing portion surrounding the at least one after-treatment substrate, an inlet cone connected to an upstream end of the center housing portion, and an outlet cone connected to a downstream end of the center housing portion;
the resonator housing surrounds at least a portion of the center housing portion; and
at least one resonator neck connects the at least one acoustic volume to the internal cavity.

6. The vehicle exhaust system according to claim 2, wherein the cold end includes a cold end pipe having a first pipe end connected to an outlet from the hot end exhaust components and a second pipe end open to atmosphere, and wherein the at least one cold end component comprises at least one of a valve, resonance free pipe, or active noise cancellation that is downstream of the resonator housing and is positioned within the cold end pipe between the first and second pipe ends.

7. The vehicle exhaust system according to claim 6, wherein the at least one cold end component comprises only one valve.

8. The vehicle exhaust system according to claim 7, wherein the at least one cold end component additionally comprises the resonance free pipe.

9. The vehicle exhaust system according to claim 7, wherein the at least one acoustic volume in the hot end comprises at least two acoustic volumes in the hot end.

10. The vehicle exhaust system according to claim 6, wherein the at least one cold end component comprises only the active noise cancellation, and wherein the at least one acoustic volume in the hot end comprises at least two acoustic volumes in the hot end.

11. The vehicle exhaust system according to claim 1, wherein the hot end treats emissions and is defined by a first overall operational length that extends from an engine outlet to a final exhaust component that treats emissions, and the cold end provides acoustic treatment and is defined by a second overall operational length that extends from the final exhaust component that treats emissions to an exhaust system outlet at one or more tailpipes.

12. A vehicle exhaust system comprising:
a hot end including one or more hot end exhaust components that treat emissions generated by an engine, wherein at least one hot end exhaust component comprises a component housing defining an internal cavity that receives at least one after-treatment substrate;
a cold end that includes a cold end pipe having a first pipe end connected to an outlet from the hot end exhaust components and a second pipe end open to atmosphere, and at least one cold end component that attenuates noise, wherein the at least one cold end component comprises at least one of a valve, resonance free pipe, or active noise cancellation that is positioned within the cold end pipe between the first and second pipe ends; and
a resonator housing in communication with the internal cavity of the component housing to provide at least one acoustic volume in the hot end to attenuate noise, wherein the at least one acoustic volume comprises a parallel or serial volume connected to the hot end downstream of the engine, and wherein at least one cold end component is downstream of the resonator housing.

13. The vehicle exhaust system according to claim 12, wherein the hot end treats emissions and is defined by a first overall operational length that extends from an engine outlet to a final exhaust component that treats emissions, and the cold end provides acoustic treatment and is defined by a second overall operational length that extends from the final exhaust component that treats emissions to an exhaust system outlet at one or more tailpipes.

14. The vehicle exhaust system according to claim 13, wherein the hot end components include at least one of a three-way catalyst, selective catalytic reduction catalyst, oxidation catalyst, or particulate filter.

15. The vehicle exhaust system according to claim 14, wherein the at least one acoustic volume is located within at least one of a catalyst housing, filter housing, or a vehicle frame member.

16. The vehicle exhaust system according to claim 15, wherein the at least one cold end component comprises only the resonance free pipe and one valve.

17. The vehicle exhaust system according to claim 15, wherein the at least one cold end component comprises only one valve.

18. The vehicle exhaust system according to claim 17, wherein the at least one acoustic volume in the hot end comprises at least two acoustic volumes in the hot end.

19. The vehicle exhaust system according to claim 15, wherein the at least one cold end component comprises only the active noise cancellation, and wherein the at least one acoustic volume in the hot end comprises at least two acoustic volumes in the hot end.

20. A method of providing a reduced package space exhaust system comprising:
providing a hot end including one or more hot end exhaust components that treat emissions generated by an engine, wherein at least one hot end exhaust component comprises a component housing defining an internal cavity that receives at least one after-treatment substrate;
providing a cold end that includes a cold end pipe having a first pipe end connected to an outlet from the hot end exhaust components and a second pipe end open to atmosphere, and at least one cold end component that attenuates noise wherein the at least one cold end component comprises at least one of a valve, resonance free pipe, or active noise cancellation;
providing a resonator housing that at least partially surrounds the component housing and is in communication with the internal cavity of the component housing to provide at least one acoustic volume parallel or serial to the hot end to attenuate noise in combination with the at least one cold end component to eliminate one or more cold end mufflers and/or resonators and reduce an overall length of the cold end; and
positioning the at least one cold end component within the cold end pipe downstream of the resonator housing and between the first and second pipe ends.

21. The method according to claim 20, including:
forming the component housing to have a center housing portion surrounding the at least one after-treatment substrate, an inlet cone connected to an upstream end of the center housing portion, and an outlet cone connected to a downstream end of the center housing portion;
forming the resonator housing to at least partially surround the component housing such that an inner surface of the resonator housing is spaced apart from an outer surface of the component housing by the at least one acoustic volume; and
connecting the at least one acoustic volume to the internal cavity with at least one resonator neck.

22. The method according to claim 21, wherein the at least one after-treatment substrate comprises at least first and second after-treatment substrates that are both enclosed within the center housing portion, and including connecting the at least one resonator neck to the center housing portion, the inlet cone, or the outlet cone.

23. The vehicle exhaust system according to claim 12, wherein:
the component housing has a center housing portion at least partially surrounding the at least one after-treatment substrate, an inlet cone connected to an upstream end of the center housing portion, and an outlet cone connected to a downstream end of the center housing portion;
the resonator housing at least partially surrounds the component housing, and wherein an inner surface of the resonator housing is spaced apart from an outer surface of the component housing by the at least one acoustic volume; and
at least one resonator neck connects the at least one acoustic volume to the internal cavity, wherein the at least one resonator neck is connected to the center housing portion, the inlet cone, or the outlet cone.

24. The vehicle exhaust system according to claim 12, wherein:
the at least one after-treatment substrate comprises at least first and second after-treatment substrates that are both enclosed within the component housing;
wherein the resonator housing is separate from or at least partially surrounds the component housing such that an inner surface of the resonator housing is spaced apart from an outer surface of the component housing by the at least one acoustic volume; and
a resonator connector fluidly connects the resonator housing to the component housing.

25. The vehicle exhaust system according to claim 24, wherein the component housing has a center housing portion at least partially surrounding the first and second after-treatment substrates, an inlet member connected to an upstream end of the center housing portion, and an outlet member connected to a downstream end of the center housing portion, and wherein the resonator connector comprises a neck or pipe that is connected to the center housing portion, the inlet member, or the outlet member.

26. The vehicle exhaust system according to claim 1, wherein:
- the component housing has a center housing portion surrounding the at least one after-treatment substrate, an inlet cone connected to an upstream end of the center housing portion, and an outlet cone connected to a downstream end of the center housing portion;
- the resonator housing at least partially surrounds the center housing portion; and
- at least one resonator neck connects the at least one acoustic volume to the internal cavity, wherein the at least one resonator neck is connected to the center housing portion, the inlet cone, or the outlet cone.

27. The vehicle exhaust system according to claim 1, wherein:
- the at least one after-treatment substrate comprises at least first and second after-treatment substrates that are both enclosed within the component housing;
- wherein the resonator housing at least partially surrounds the first and second after-treatment substrates; and
- a resonator connector fluidly connects the resonator housing to the component housing.

28. The vehicle exhaust system according to claim 27, wherein the component housing has a center housing portion at least partially surrounding the first and second after-treatment substrates, an inlet member connected to an upstream end of the center housing portion, and an outlet member connected to a downstream end of the center housing portion, and wherein the a resonator connector comprises a neck or pipe that is connected to the center housing portion, the inlet member, or the outlet member.

\* \* \* \* \*